United States Patent [19]

Maruoka

[11] Patent Number: 5,257,106
[45] Date of Patent: Oct. 26, 1993

[54] TELEVISION SIGNAL RECEIVER WITH MEMORY FOR STORING DATA ON DIFFERENT TELEVISION SYSTEM

[75] Inventor: Kazuhisa Maruoka, Kanagawa, Japan

[73] Assignee: Sony Corporation, Tokyo, Japan

[21] Appl. No.: 744,251

[22] Filed: Aug. 13, 1991

[30] Foreign Application Priority Data

Aug. 28, 1990 [JP] Japan .................. 2-225758

[51] Int. Cl.$^5$ .................. H04N 5/50; H04N 5/262; H04N 5/267
[52] U.S. Cl. .................. 358/191.1; 358/193.1; 358/181
[58] Field of Search .................. 358/140, 183, 181, 191.1, 358/194.1, 11, 193.1, 188

[56] References Cited

U.S. PATENT DOCUMENTS

| | | | |
|---|---|---|---|
| 4,984,081 | 1/1991 | Miyoshi et al. | 358/140 |
| 5,065,243 | 11/1991 | Katagiri | 358/140 |
| 5,083,205 | 1/1992 | Arai | 358/140 |
| 5,132,793 | 7/1992 | Hirahata et al. | 359/140 |

FOREIGN PATENT DOCUMENTS 0050977  3/1991  Japan .

*Primary Examiner*—Victor R. Kostak
*Assistant Examiner*—Michael H. Lee
*Attorney, Agent, or Firm*—Lewis H. Eslinger; Jay H. Maioli

[57] ABSTRACT

A television signal receiver receives both an ordinary television signal, such as a PAL television signal, and a high-definition television signal, such as a MAC television signal. The television signal receiver has a memory for storing data indicative of whether an indicated channel contains a PAL television signal or a MAC television signal. Based on the data read from the memory, a CPU controls a PAL/MAC selector to select a PAL television signal or a MAC television signal.

1 Claim, 3 Drawing Sheets

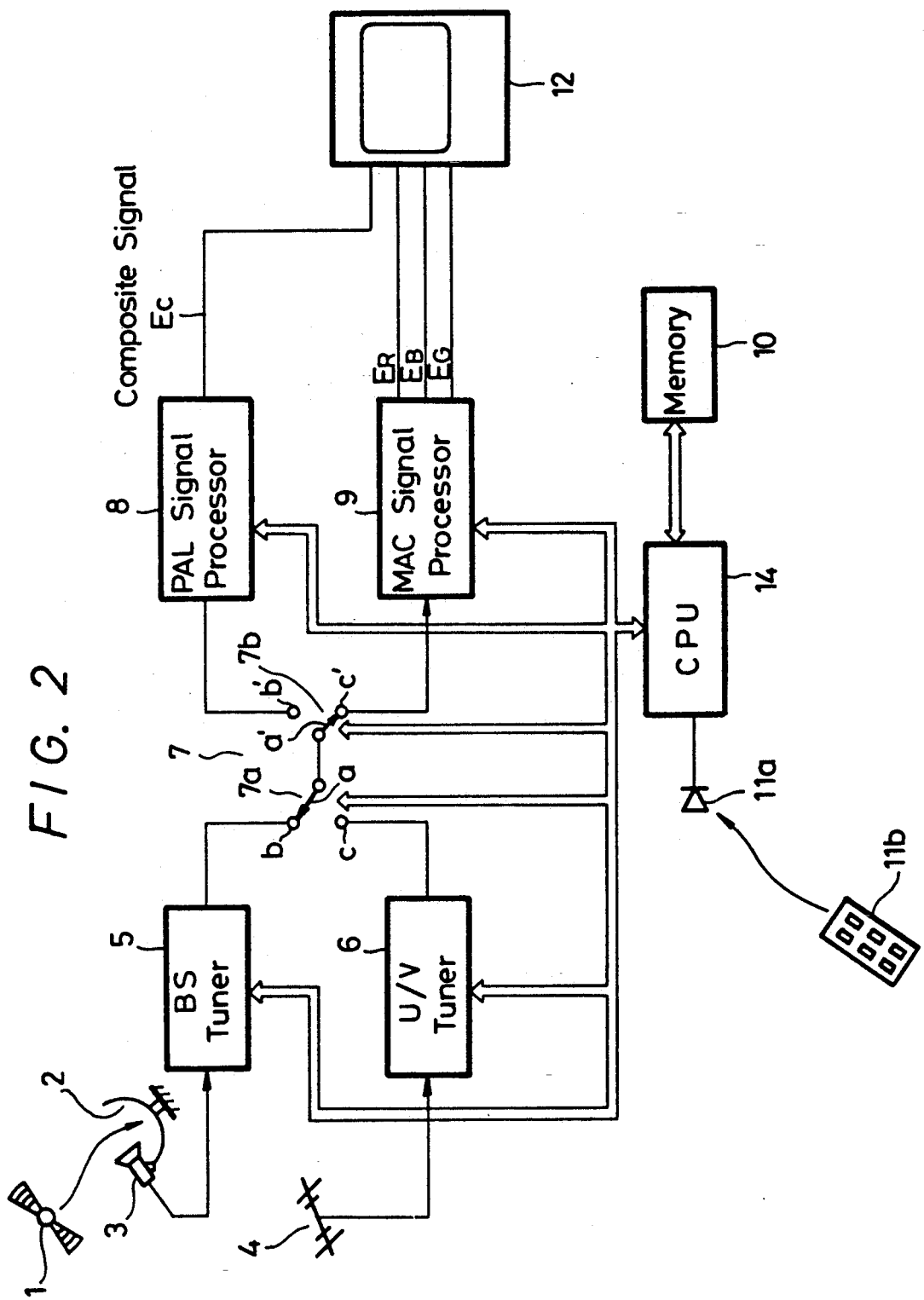

TELEVISION SIGNAL RECEIVER WITH MEMORY FOR STORING DATA ON DIFFERENT TELEVISION SYSTEM

BACKGROUND OF THE INVENTION

1. Field of the Invention

The present invention relates to a television signal receiver capable of receiving color television signals of different systems, e.g., the NTSC (National Television Systems Committee) system, the PAL (Phase Alteration Line) system, and the MAC (Multiplexed Analogue Component) system which is a time division system.

2. Description of the Prior Art

Satellite television broadcasting is finding wider use in recent years. Some television signal receivers, which have begun to be commercially available, are capable of receiving high-definition television signals broadcast by satellite and also VHF and UHF signals of the NTSC and PAL systems. For example, certain color television signal receivers that are commercially available in Japan can receive NTSC television signals, BS television signals, and high-definition television signals. Some European color television signal receivers are able to receive PAL and MAC television signals.

According to the PAL system, the color subcarrier is modulated by a balanced modulator with two chrominance signals, and one of the chrominance signals is inverted in phase per scanning line in the process of generating the same carrier chrominance signal as that used in the NTSC system. There have been proposed various versions of the MAC system, and they are known as the A-MAC system, B-MAC system, C-MAC system, D-MAC system, and D2-MAC system. FIGS. 1A, 1B, and 1C of the accompanying drawings show the basic signal time-division multiplex formats of the B-MAC, C-MAC, and D2-M systems, respectively, which are presently in use or planned for use. The common concept among these MAC variations is that analogue-comonent video signals are broadcast on air according to the MAC system, and differs from the NTSC system in which luminance and chrominance signals are frequency-multiplexed and broadcast on air. According to the MAC system, the luminance signal is time-divided for all lines, the color difference signal is time-divided alternately per line, and the audio signal is converted into a digital signal for transmission.

The basic signal time-division multiplex formats of the B-MAC, C-MAC, and D2-MAC systems shown respectively in FIGS. 1A, 1B, and 1C will be described below. In each of these systems, the color difference signal in one horizontal scanning time H (64 ms) is time-compressed to 3 : 1, and the luminance signal in one H is time-compressed to 3 : 2. In the B-M system, the bandwidth after time compression is 7.5 MHz. In the C-MAC system and the D2-MAC system, the bandwidth after time compression is 8.4 MHz.

In the B-MAC system shown in FIG. 1A, the digital audio signal and independent data are subject to binary or binary/quaternary conversion, time-divided in the baseband during the retrace interval of the video signal, and frequency modulated together with the video signal. In the C-MAC system shown in FIG. 1B, the digital audio signal and independent data are time-compressed so that they can be time-division-multiplexed during the retrace interval of the video signal, and then modulated by phase-shift keying (PSK), and the retrace interval of the video signal is replaced with the PSK-modulated audio signal. The digital signal to be multiplexed is transmitted as a packet. The D2-MAC system shown in FIG. 1C operates as follows: When C-MAC television signals are to be transmitted by CATV (cable television), since the signals are wideband signals, they cannot be transmitted over the conventional cables. Therefore, the video signal is limited in band, and the digital signal to be multiplexed is reduced to half. Then, the video signal is modulated by VSB-AM, and the digital signal is time-division-multiplexed in the retrace interval of the video signal.

A television signal receiver which is capable of receiving PAL and MAC television signals determines whether the received signal is a PAL or MAC television signal each time a channel is selected. More specifically, the television signal receiver has a MAC signal processing circuit for reading a flag "1" which indicates the MAC system, from received MAC-system digital data, so that the received television signal is of the MAC system. However, it takes about 1 second for a PLL circuit in a decision circuit in the MAC signal processing circuit to stabilize, and it also takes about 1 second to select a desired station or channel after the received television signal has been determined as being of the MCA system. Therefore, the channel selection process is relatively time-consuming since about 2 seconds are consumed each time a desired channel is selected.

OBJECTS AND SUMMARY OF THE INVENTION

In view of the above problems of conventional television signal receivers, it is an object of the present invention to provide a television signal receiver which can select desired channels or stations within a short period of time.

According to the present invention, there is provided a television signal receiver for receiving ordinary television signals and high-definition television signals in available channels, comprising memory means for storing data indicative of whether each of the channels contains an ordinary television signal or a high-definition television signal, selector means for selecting an ordinary or high-definition television signal at a time, and control means for controlling the memory means and the selector means. The control means comprises means for reading the data from the memory means with respect to an indicated channel and controlling the selector means to select an ordinary or high-definition television signal based on the read data.

When a desired channel is indicated, the control means reads the data from the memory means with respect to the indicated channel. The control means then controls the selector means to select an ordinary television signal or a high-definition television signal, based on the data read from the memory. The control means is therefore not required to carry out a process of determining whether the received signal is an ordinary television signal or a high-definition television signal. Accordingly, a desired channel can be selected very quickly.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIG. 2 is a block diagram of a television signal receiver according to the present invention;

DETAILED DESCRIPTION OF THE PREFERRED EMBODIMENTS

Figures 1A, 1B, 1C:
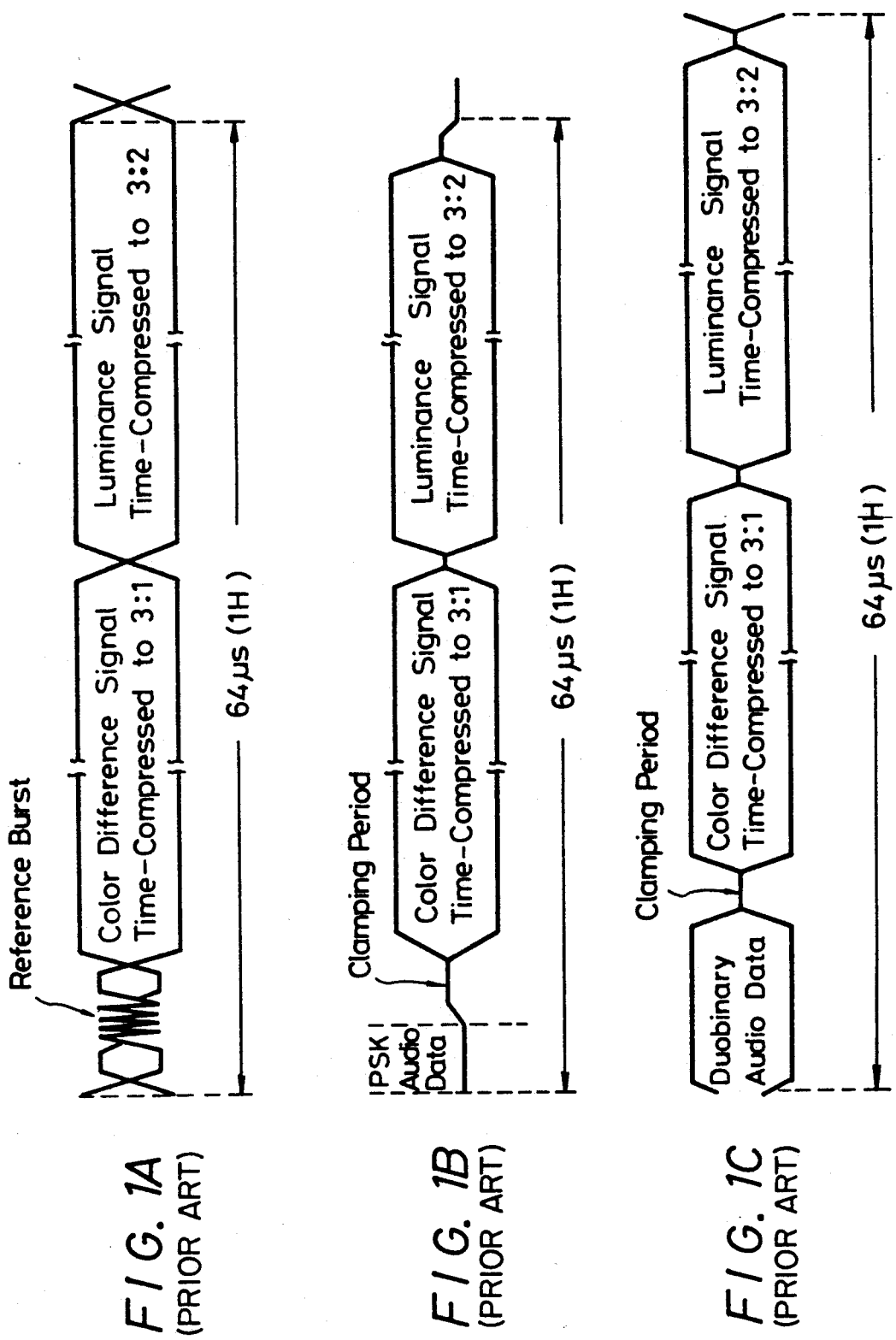
FIGS. 1B and 1C are diagrams showing the basic signal time-division multiplex formats of different MAC system variations.
Figure 3:
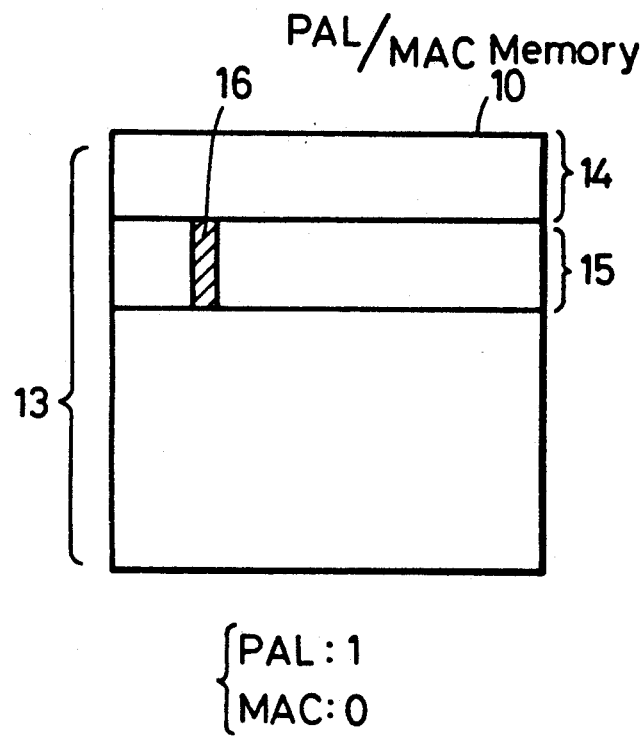
FIG. 3 is a diagram of the storage area of a memory in the television signal receiver shown in FIG. 2.

The principles of the present invention are particularly useful when embodied in television signal receivers shown in FIGS. 2 and 3. In each of the illustrated embodiments, the television signal receiver is shown as being of the PAL/MAC reception type which can receive an ordinary color television signal, such as of the PAL system in which the luminance and chrominance signals are frequency-multiplexed, and also can receive a high-definition color television signal, such as of the MAC system in which the luminance signal is time-division-multiplexed for all lines and the color difference signal is time-division-multiplexed alternately per line.

As shown in FIG. 2, a MAC-system color television signal broadcast by a satellite 1 is received by a BS antenna 2. The received color television signal is supplied through a BS converter 3 on the BS antenna 2 to a BS tuner 5 by which a desired channel is selected. Video and audio signals of the selected channel are supplied from the BS tuner 5 to a PAL/MAC selector 7. The PAL/MAC selector 7 comprises two switches 7a, 7b, one switch 7a having a movable contact a and two fixed contacts b, c, and the other switch 7b having a movable contact a' and two fixed contacts b', c'. At this time, the PAL/MAC selector 7 is shifted so that the video and audio signals pass from the fixed contact b to the movable contact a to the movable contact a' to the fixed contact c'. When a PAL-system color television signal, for example, is received by an antenna 4, video and audio signals of a selected station are supplied from a UHF/VHF tuner 6 to the PAL/M selector 7. At this time, the PAL/MAC selector 7 is shifted so that the video and audio signals pass from the fixed contact c to the movable contact a to the movable contact a' to the fixed contact b'.

The fixed contacts b, c of the switch 7a are connected to the BS tuner 5 and the UHF/VHF tuner 6, respectively. The fixed contacts b', c' of the switch 7b are connected respectively to an ordinary television signal processor, which is a PAL signal processor 8 in this embodiment, and a high-definition television signal processor, which is a MAC signal processor 9 in this embodiment. The movable contacts a, a' of the switches 7a, 7b are connected to each other.

The PAL signal processor 8 outputs a composite signal EC to a display unit 12. The MAC signal processor 9 outputs component signals ER, EG, EB corresponding to three primaries R, G, B, respectively, to the display unit 12. The BS tuner 5, the UHF/VHF tuner 6, the PAL/MAC selector 7, the PAL signal processor 8, the M signal processor 9, and a memory 10 are controlled by a microcomputer (CPU) 14. A photodetector 11a connected to the CPU 14 receives a command from a remote commander 11b and transmits the received command to the CPU 14. In response to the transmitted command, the CPU 14 carries out a necessary operation based on the command.

Heretofore, when a MAC television signal of a selected channel is received, the CPU 14 determines the received television signal as being a MAC television signal based on a flag from the BS tuner 5. In the absence of such a flag, the CPU 14 determines the received television signal as being a PAL television signal. The CPU 14 then controls the PAL/MAC selector 7 to switch to the received television signal. According to the present invention, as shown in FIG. 3, the memory 10, which may comprise a PROM or the like, has a storage area 13 which includes a channel storage area 14 and a system data storage area 15. The system data storage area 15 stores an ID for each channel, which ID comprises a 1-bit PAL/MAC flag 16 that is "1" if the television signal of a selected channel is a PAL television signal, and "0" if the television signal of a selected channel is a MAC television signal. When the user indicates a certain channel through the remote commander 11b, the CPU 14 reads the ID of the indicated channel from the system data storage area 15, and supplies switching signals to the PAL/M selector 7 through a data bus to shift the switch 7a for selecting the indicated channel and also to shift the switch 7b for processing the received television signal. More specifically, if an indicated channel is a MAC channel, then the movable contacts a, a', of the switches 7a, 7b are shifted into contact with the fixed contacts b, c', respectively. Therefore, the MAC signal processor 9 supplies component signals ER, EB, EG to the display unit 12, which then displays images in the selected MAC channel. If an indicated channel is a PAL channel, then the movable contacts a, a', are shifted into contact with the respective fixed contacts c, b', and the PAL signal processor 8 supplies a composite signal EC to the display unit 12. The display unit 12 then displays images in the selected PAL channel.

Figure 4:
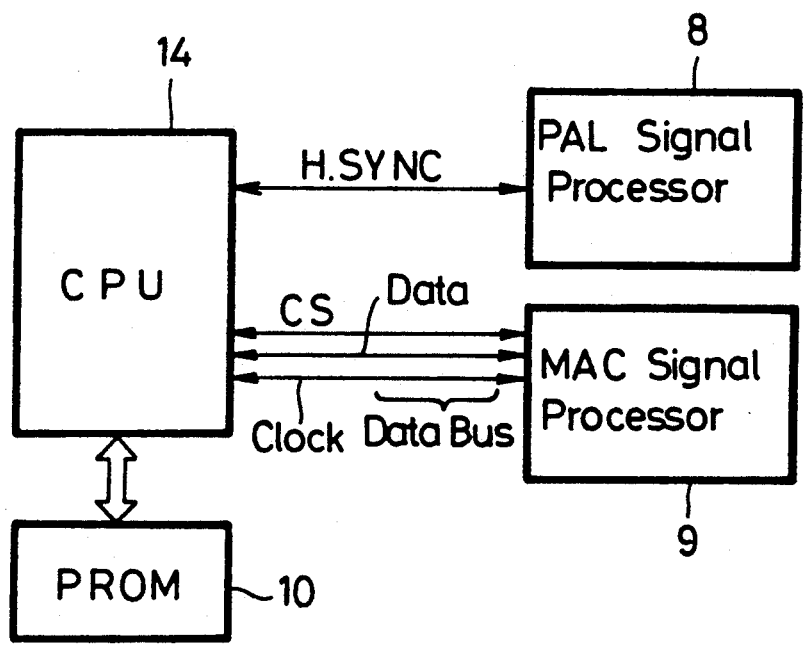
FIG. 4 is a block diagram of a television signal receiver according to another embodiment of the present invention.

FIG. 4 shows a television signal receiver according to another embodiment of the present invention. In the future, it may be possible for the signal transmitting side to convert PAL television signals into MAC television signals, or conversely, to convert MAC television signals into PAL television signals. In the arrangement shown in FIG. 4, even after a certain channel has been selected, the CPU 14 monitors, in periodic cycles each of 250 msec. a horizontal synchronizing signal (H.SYNC) from the PAL signal processor 8 and also an ID from the MAC signal processor 9 through a data bus (which is shown as being a three-wire bus). Therefore, when PAL television signals are converted into MAC television signals or vice versa, the existing IDs are rewritten by converted IDs in the memory 10, and a subsequent channel selection is performed on the basis of the newly stored IDs.

The PAL/MAC television signal receiver in the illustrated embodiments is capable of selecting a PAL channel in about 200 msec. and a MAC channel in about 400 msec., which is about 1/5 of 2000 msec. that the conventional television signal receiver has taken to select a MAC channel. The PAL/MAC television signal receiver according to the present invention is also less likely to cause errors in determining whether a received television signal is a PAL or MAC television signal.

While the present invention has been described as being applied to the PAL/MAC television signal receiver in the above embodiments, the principles of the invention are also applicable to other television signal receivers which can output component signals (R. G. B) and a composite signal, such as a television signal receiver which can receive NTSC television signals and MUSE (Multiple-sub-Nyquist-sampling-encoding).

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

I claim as my invention:

1. A television signal receiver for receiving ordinary television signals and high-definition television signals in a plurality of available channels, said television signal receiver comprising:

memory means for storing ID data indicating whether each of the plurality of channels contains an ordinary television signal of a high-definition television signal;

selector means for selecting an ordinary or high-definition television signal one at a time;

first processing means connected to said selector means for processing ordinary television signals;

second processing means connected to said selector means for processing high-definition television signals; and control means connected to said memory means and to said selector means for controlling said memory means to read the ID data with respect to an indicated channel and for controlling said selector means to connect an ordinary television signal to said first processing means or a high-definition television signal to said second processing means based on the data read from said memory means, and wherein said control means further comprises means for monitoring a signal from said first processing means and for monitoring a signal from said second processing means and for rewriting the ID data stored in said memory means based on the monitored signals.

* * * * *

UNITED STATES PATENT AND TRADEMARK OFFICE
CERTIFICATE OF CORRECTION

PATENT NO. : 5,257,106

DATED : October 26, 1993

INVENTOR(S) : Kazuhisa Maruoka

It is certified that error appears in the above-indentified patent and that said Letters Patent is hereby corrected as shown below:

```
Col. 1, line 38, change "D2-M" to --D2-MAC--
        line 63, after "frequency" insert -----
Col. 3, line 5,  after "Figs." insert --1A,--
        line 47, change "M" to --MAC--
        line 67, change "M" to --MAC--
Col. 4, line 26, change "M" to --MAC--

Col. 6, line 1,  change "of" to --or--
```

Signed and Sealed this

Eighteenth Day of June, 1996

Attest:

BRUCE LEHMAN

Attesting Officer       Commissioner of Patents and Trademarks